(12) United States Patent
Kaltto et al.

(10) Patent No.: US 7,349,805 B2
(45) Date of Patent: Mar. 25, 2008

(54) WRISTOP COMPUTER AND A METHOD IN CONNECTION WITH IT

(75) Inventors: Mikko Kaltto, Kellokoski (FI); Jyrki Uusitalo, Virkkala (FI)

(73) Assignee: Suunto Oy, Vantaa (FI)

( * ) Notice: Subject to any disclaimer, the term of this patent is extended or adjusted under 35 U.S.C. 154(b) by 168 days.

(21) Appl. No.: 11/152,076

(22) Filed: Jun. 15, 2005

(65) Prior Publication Data

US 2005/0283313 A1 Dec. 22, 2005

(30) Foreign Application Priority Data

Jun. 16, 2004 (FI) .................................. 20040831

(51) Int. Cl.
*G01C 17/02* (2006.01)
(52) U.S. Cl. ......................... 701/224; 368/10
(58) Field of Classification Search ............... 701/224; 368/10, 14, 223, 281, 282, 283; 33/361, 33/272, 349, 271, 355 R; 73/865.1; 128/201.27, 128/204.23
See application file for complete search history.

(56) References Cited

U.S. PATENT DOCUMENTS

| | | | | |
|---|---|---|---|---|
| 3,660,907 A * | 5/1972 | Sutherland | .................. | 33/349 |
| 4,882,678 A * | 11/1989 | Hollis et al. | ................ | 73/865.1 |
| 5,175,936 A | 1/1993 | Sato | | |
| 5,187,871 A | 2/1993 | McDermott | | |
| 5,381,603 A | 1/1995 | Lee | | |
| 5,600,611 A | 2/1997 | Kamens | | |
| 5,749,150 A * | 5/1998 | McDermott | .................. | 33/361 |
| 5,790,477 A * | 8/1998 | Hauke | .......................... | 368/10 |
| 6,972,715 B2 * | 12/2005 | Hollis et al. | ........... | 342/357.07 |
| 7,165,013 B2 * | 1/2007 | Watson | ....................... | 702/188 |

FOREIGN PATENT DOCUMENTS

EP 0280546 A2 8/1988

* cited by examiner

*Primary Examiner*—Dalena Tran
(74) *Attorney, Agent, or Firm*—Birch, Stewart, Kolasch & Birch, LLP

(57) ABSTRACT

The invention relates to a wristop computer and a method in connection with a wristop computer (20). The display of the wristop computer intended for a compass application consists of a matrix-display element (1). The wristop computer includes means (10, 11, 12) for showing the compass points to the possessor of the wristop computer, with the aid of graphical symbols. According to the invention, the wristop computer includes means (1, 11, 4) for showing several predefined bearing values (2) for travelling over various closed patterns.

16 Claims, 3 Drawing Sheets

WRISTOP COMPUTER AND A METHOD IN CONNECTION WITH IT

The invention relates to a wristop computer according to claim 1.

The invention also relates to a method in connection with a wristop computer.

According to the prior art, wristop computers include several different functions to be applied in different leisure activities. Compass functions are implemented in several wristop computers. For instance, U.S. Pat. No. 5,381,603 discloses an electrical compass.

Particularly wristop computers suitable for diving require special properties that are not provided in wristop computers according to the prior art. When diving, the display should be especially clear and particularly when orienting under water the instructions for navigation should be clear and graphic.

In solutions according to the prior art, it has been possible to set a target direction and monitor adherence to the target direction on the display of the wristop computer.

However, in instrument diving predefined routes, typically triangular, square, or back-and-forwards routes, are typically used to ensure safety. Known wristop computers, have no tools for monitoring the turns in these routes, which means that in difficult diving conditions compass reading errors or errors in determining the correct bearing can arise at turns.

The present invention is intended to eliminate the defects of the prior art described above and for this purpose create an entirely new type of solution.

The invention is based on the wristop computer including means for presenting several predefined bearing values, for example, as graphical symbols on the display, or as other indicators for following various closed patterns.

According to one preferred embodiment of the invention, the bearings of a triangle pattern are shown using graphical symbols.

According to a second preferred embodiment of the invention, the bearings of a square or rectangle pattern are shown using graphical symbols.

According to a third preferred embodiment of the invention, the user is given alarms at a pre-programmed turning point.

More specifically, the wristop computer according to the invention is characterized by what is stated in the characterizing portion of claim 1.

The method according to the invention is, in turn, characterized by what is stated in the characterizing portion of claim 9.

Considerable advantages are gained with the aid of the invention.

Using the display arrangement according to the invention the route is made safe for the diver, thanks to the unambiguous instructions of the compass.

There is no need to calculate the angles for different kinds of route; instead the correct bearing for a turn for different types of pattern can be read directly from the display.

Safety is further increased with the aid of the trip measurement and alarm devices according to the invention.

In terms of the wristop computer, the advantage of the procedure according to the invention is that a separate new display element is not required; instead the solution can be implemented, for example, purely by software, or as a combination of software and electronics solutions.

In the following, the invention is examined with the aid of embodiments according to the accompanying drawings.

FIGS. 1-11 show the display 1 according to the invention, in such a way that FIG. 1 shows the initial situation, in which the starting bearing is towards the south-east (135°). In the solutions of FIGS. 2-11, the compass is turned clockwise from figure to figure, so that in FIG. 11 the compass has passed the north direction and the bearing in the situation of FIG. 11 is 15°.

Figure 1:
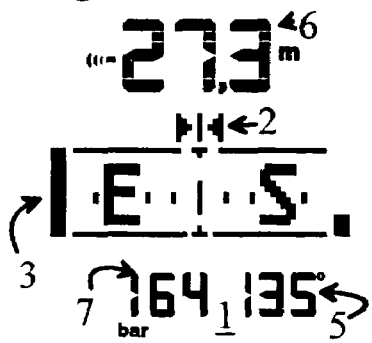
FIGS. 1-11 show the display of the wristop computer according to the invention in different states.
Figure 2:
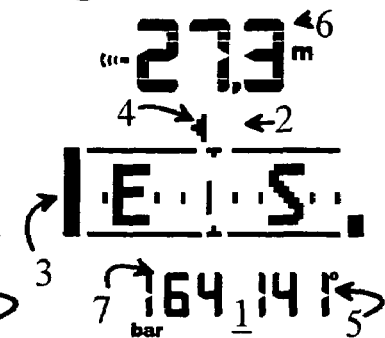
Figure 3:
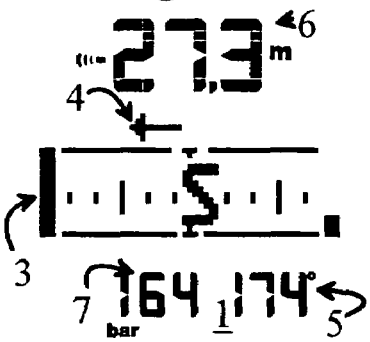
Figure 4:
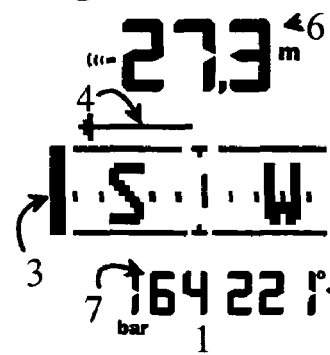

According to FIG. 1, the display 1 of the wristop computer includes a centre symbol 2, a path symbol, which is used as the most central display element of the solution according to the invention. In addition, the display typically includes a compass-point scale 3, the symbol of which next to the path symbol 2 shows the main point of the compass at that moment, in other words, the compass point at the path-symbol symbol 2. In the case of FIG. 1, the compass point is south-east (ES). In addition, possible display elements include a depth reading 6 and a pressure reading 7. The embodiment according to FIGS. 1-11 thus depicts the wristop computer in a diving application.

The arrow symbol of FIGS. 2-9 shows the amount of deviation from the initial heading. The farther the progress clockwise from the initial heading, the farther the arrow point 4 moves to the left. When the rotation exceeds 90°, the shaft of the arrow begins to shorten and at 180° (FIG. 9) only the point 4 of the arrow is visible at the extreme left-hand position while at the same time the corresponding right-hand symbol of the display 1 is activated.

Figure 5:
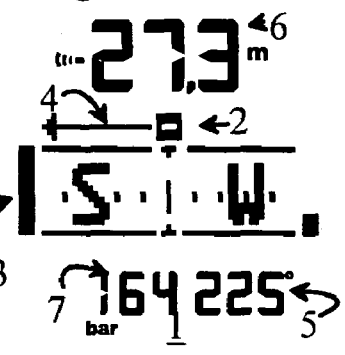

In the situation according to FIG. 5, a 90° turn has been made and a pattern symbol 2, equipped with a horizontal line, appears in the display of the compass as a signal that the bearing after turning is correct, if diving follows a rectangular or square pattern.

Figure 6:
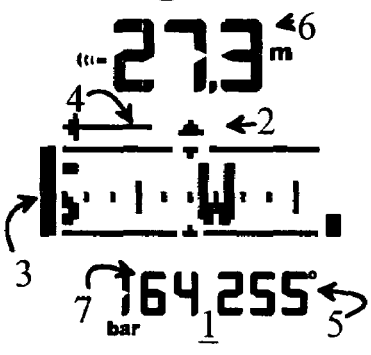

In the situation according to FIG. 6, a 120° turn has been made and a triangular sign 2 has appeared in the display as a pattern symbol, showing that the amount of the turn is correct for a triangular pattern.

Figure 9:
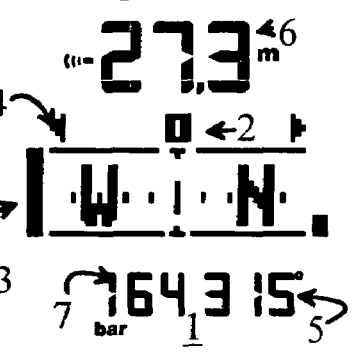

In FIG. 9, a graphical symbol 2 has appeared in the display, in which there is a vertical sign inside a rectangle, to give the diver who is turning an instruction that the heading is now correct, if a back-and-forwards route is being used, in which the diver returns to the starting point along the same route that was used to reach the turning point. In other words, the pattern symbol 2 according to FIG. 9 appears once the turn from the initial bearing is 180°. The same symbol is also used in the second turn of a square or rectangular pattern.

Figure 11:
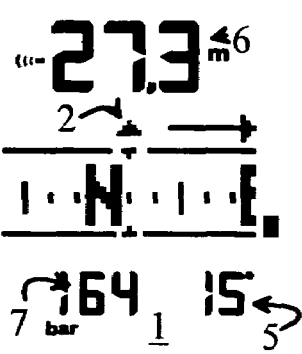

In the situation according to FIG. 11, a 240° turn has been made and, as a sign of this, the triangle sign 2 has again appeared in the display, showing that the amount of the turn is correct for the second turn of a triangular pattern.

After FIG. 11, the path symbol 2 according to FIG. 5 appears again with the number of degrees 45°, as a sign for the third turn of a square or rectangular pattern.

FIGS. 1-11 are explained further with the aid of the accompanying table, in which in the column "Display symbol" the turning angle 5 is shown as a function, with the aid of both the arrow symbol 4 and the pattern symbol 2. The degree range shown in the column "Direction from bearing" is, of course, by way of example. The "Comments"-column shows comments on the links of the table to FIGS. 1-11.

TABLE 1

| Display Symbol | | Direction from bearing | | Comment |
|---|---|---|---|---|
| ▶|◀ | | 000°–+004° | −004°–000° | Bearing, arrows inwards, vertical line in centre. FIG. 1 |
| ◀ | ▶ | +005°–+007° | −007°––005° | FIG. 2 |
| ◀ | ▶ | +008°–+012° | −012°––008° | |
| ◀ | ▶ | +013°–+017° | −017°––013° | |
| ← | → | +018°–+022° | −022°––018° | |
| ← | → | +023°–+027° | −027°––023° | |
| ← | → | +028°–+032° | −032°––028° | |
| ← | → | +033°–+037° | −037°––033° | |
| ← | → | +038°–+042° | −042°––038° | FIG. 3 |
| ← | → | +043°–+047° | −047°––043° | |
| ← | → | +048°–+052° | −052°––048° | |
| ← | → | +053°–+057° | −057°––053° | |
| ← | → | +058°–+062° | −062°––058° | |
| ← | → | +063°–+067° | −067°––063° | |
| ← | → | +068°–+072° | −072°––068° | |
| ← | → | +073°–+077° | −077°––073° | |
| ← | → | +078°–+082° | −082°––078° | |
| ← | → | +083°–+087° | −087°––083° | FIG. 4 |
| ←▫ | ▫→ | +088°–+092° | −092°––088° | Square with horizontal line in centre. FIG. 5 |
| ← | → | +093°–+097° | −097°––093° | |
| ← | → | +098°–+102° | −102°––098° | |
| ← | → | +103°–+107° | −107°––103° | |
| ← | → | +108°–+112° | −112°––108° | |
| ← | → | +113°–+117° | −117°––113° | |
| ← ▲ | ▲ → | +118–+122 | −122°––118° | Triangle in centre. FIGS. 6 and 11 |
| ← | → | +123°–+127° | −127°––123° | |
| ← | → | +128–+132 | −132°––128° | |

TABLE 1-continued

Figure 7:
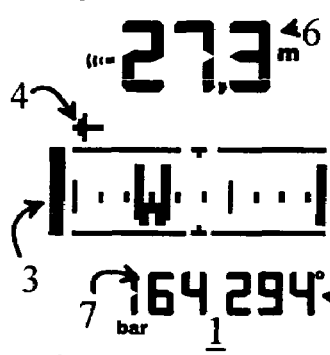
Figure 8:
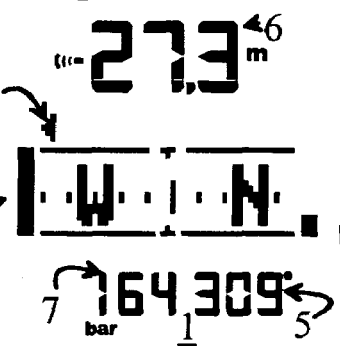
Figure 10:
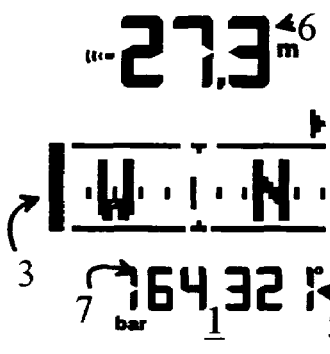

| Display Symbol | | Direction from bearing | | Comment |
|---|---|---|---|---|
| ← | → | +133°–+137° | −137°––133° | |
| ← | → | +138–+142 | −142°––138° | |
| ← | → | +143–+147 | −147°––143° | |
| ← | → | +148–+152 | −152°––148° | |
| ← | → | +153–+157 | −157°––153° | |
| ← | → | +158–+162 | −162°––158° | FIG. 7 |
| ◄ | ► | +163–+167 | −167°––163° | |
| ◄ | ► | +168–+172 | −172°––168° | |
| ◄ | ► | +173–+175 | −175°––173° | FIG. 8 and 10 |
| ◄ □ ► | | +176–+180 | −180°––176° | Opposite bearing, square with vertical line in centre. FIG. 9 |

Figure 12:
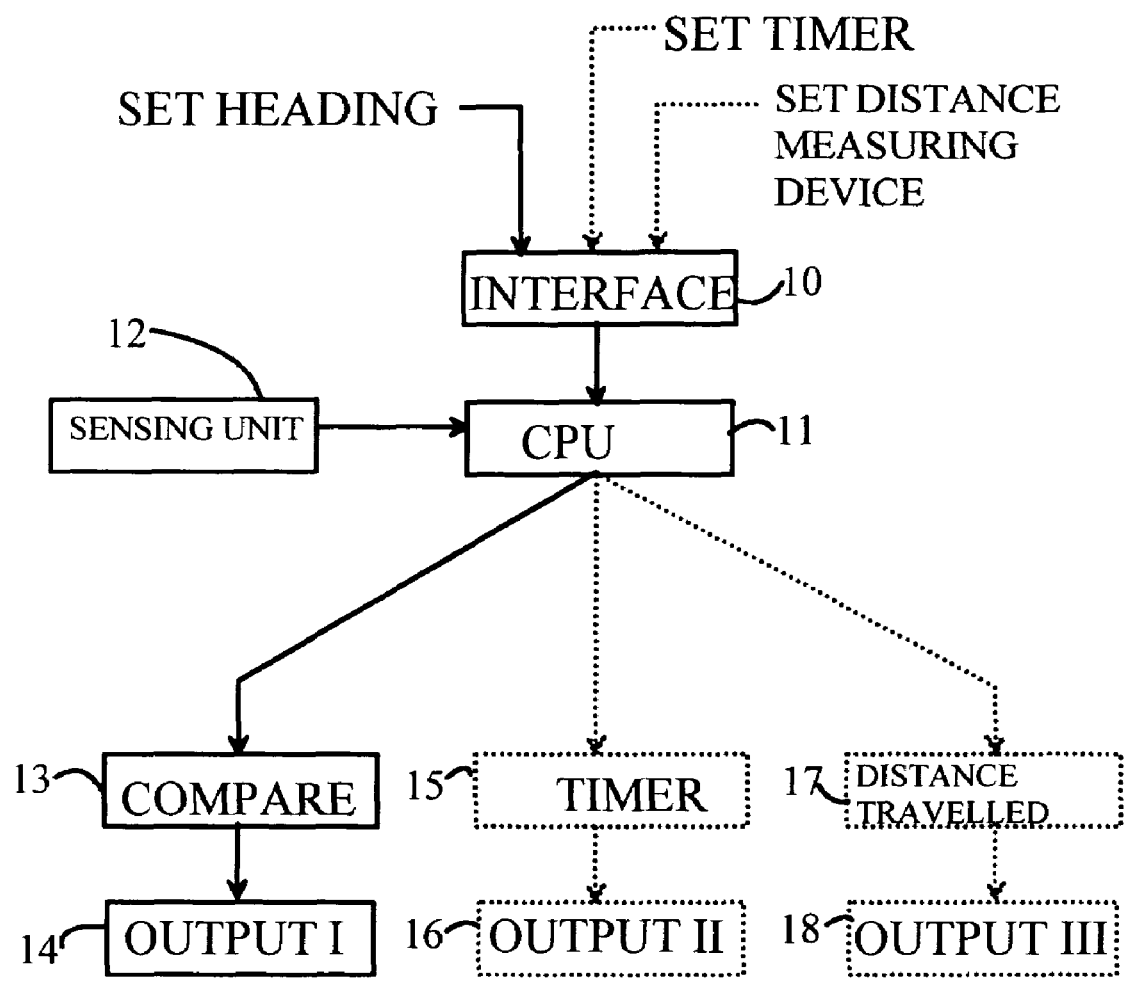
FIG. 12 shows a block diagram of the control logic of the display according to the invention.

FIG. 12 shows a flow chart, in which the user interface is depicted by the block 10, which includes the necessary keys and display. The system is controlled by the CPU 11 (CENTRAL PROCESSING UNIT), to which the sensing unit 12 (SENSING UNIT) provides information on the direction. In this case, the sensing unit is an electric compass. The user locates the selected direction and sets it as the heading (SET HEADING), for example, using a press button, sound vibration, or some other similar signal.

The CPU 11 compares 13 the set heading with the direction of travel at that moment and, if the difference between them is in accordance with some standard route (0°, 180°, −90°, −120° or +120°) or a set route (e.g., custom-route pentagon 72°), it gives the user a predefined OUTPUT I 14 (linear, square, triangular symbol on the display, a sound signal, light image, or vibration).

As an additional function, the user can use a preset timer 15 (TIMER) for navigation. The TIMER 15 function can be set by starting it simultaneously with the HEADING function, or else it can be started only once the navigation starts. Once the set time has passed, the user is given a predefined OUTPUT II 16, (e.g., a sound or similar). The time can also be defined automatically according to the length of the first leg.

The user can also start the measurement 17 (SET ODOGRAPH) of the distance travelled, either simultaneously with the HEADING function, or separately. Once the desired distance has been travelled, the user is given a predefined OUTPUT III 18. The distance can also be defined according to the length of the first leg. When diving, it is possible to use a kick-pair counter, water-flow meter, measurement of speed based on ultrasound with the aid of an echo or an ultrasound beacon, and, on the surface, a step meter or GPS.

Figure 13:
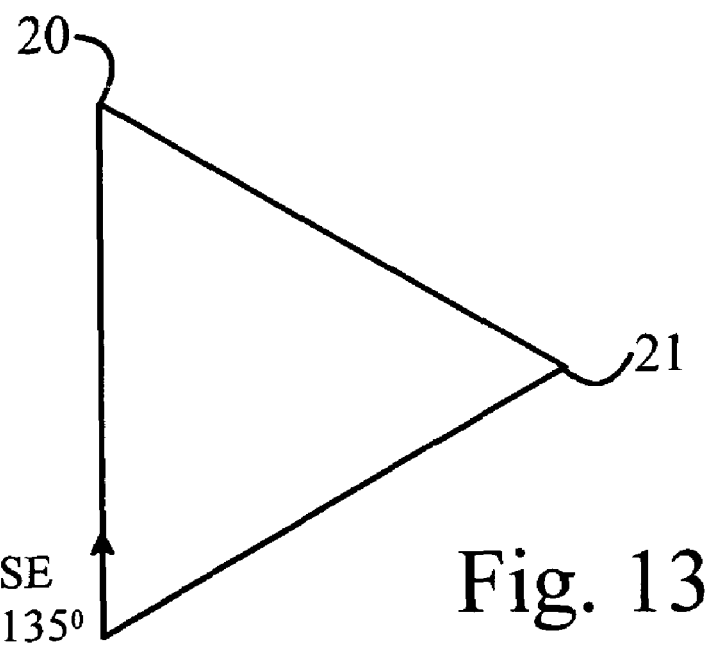
FIG. 13 shows a triangular route, which is described later with reference to displays—11.

FIG. 13 shows the use of the solution according to the invention in connection with a triangular path. At the starting point (Start) the heading is to the south-east (135°) and the view in the wristop computer is according to FIG. 1. At point 20, either from the user's own step measurement, or by an alarm, a turn of 120°, indicated by a triangle symbol 2 formed in the display 1, is made according to FIG. 6. Next, a point 21, either from the user's own step measurement, or by an alarm, a turn of 120°, indicated by a triangle symbol 2 formed in the display 1, is made according to FIG. 11, by means of which heading a return is made to the starting point (Start).

Figure 14:
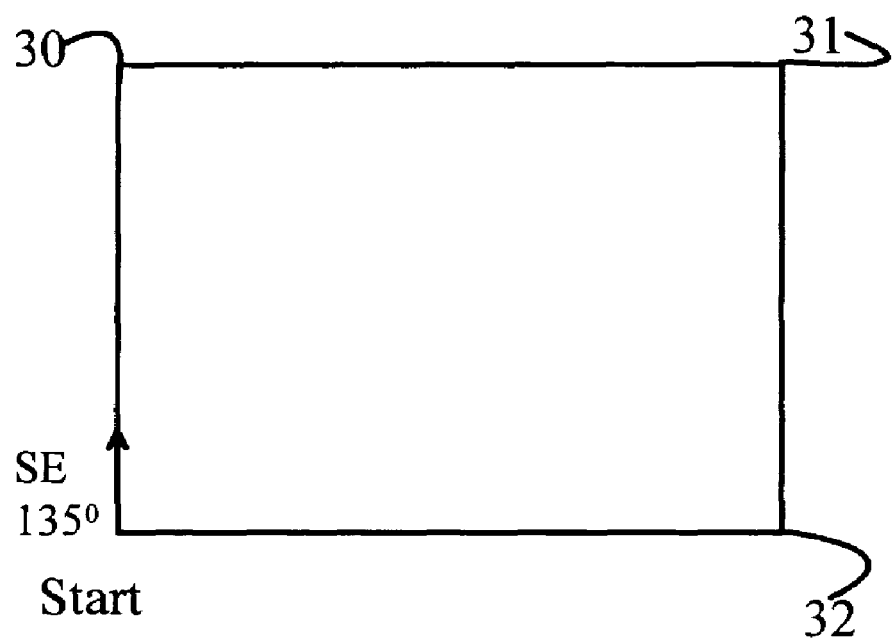
FIG. 14 shows a square or rectangular route, which is described later with reference to FIGS. 1-11.

Correspondingly, FIG. 14 shows the use of the solution according to the invention in connection with a square or rectangular path. At the starting point (Start), the heading is to the south-east (135°) and the view in the wristop computer according to FIG. 1. At point 30, either from the user's own step measurement, or by an alarm, a turn of 90°, indicated by a rectangular symbol 2 formed in the display 1, is made according to FIG. 5. Next, at point 31, either from the user's own step measurement, or by an alarm, a turn of 90°, indicated by a rectangular symbol 2 with a vertical line, formed in the display 1, is made according to FIG. 9, by means of which heading point 32 is reached. Next, at point 32, either form the user's own step measurement, or by an alarm, a turn of 90° is made, indicated by a rectangular symbol 2 with a vertical line, formed in the display 1, as in FIG. 5, with, however, a reading of 45°, by means of which heading a return is made to the starting point (Start).

A liquid crystal display, for example, is suitable for use as the display of the wristop computer according to the invention. The display can be either black-and-white, or coloured. Naturally, other display technologies too can be used, such as electroluminence and plasmadisplays.

The invention claimed is:

1. A wristop computer for a compass application, the display of which consists of a display element, the wristop computer comprising:

a processor;

means for determining compass points;

means for displaying said compass points to the processor of the wristop computer, with the aid of graphical symbols; and means for showing a user of the wristop computer several predefined bearing values based on a predefined heading, for traveling over various closed patterns; and means for selecting any one of said predefined bearing values for keeping the user constantly aware of how a present bearing relates to the predefined heading.

2. A wristop computer according to claim 1, further comprising means for showing the bearing values of a triangular pattern at 60-degree intervals.

3. A wristop computer according to claim 1, comprising: means for showing the bearing values of a square pattern at 90-degree intervals.

4. A wristop computer according claim 1, wherein the bearing values are shown with the aid of the display, using the graphical symbols.

5. A wristop computer according to claim 1, wherein the bearing values are shown with the aid of vibration or sound or a light image.

6. A wristop computer according to claim 1, wherein there is an alarm in the wristop computer for the turning points in the various patterns.

7. A wristop computer according to claim 6, wherein the alarm is set to give an alarm on the basis of time, the distance traveled, or the measured flow.

8. A wristop computer according to claim 6, wherein the alarm is set to give an alarm using light, vibration, or sound.

9. A method for a compass application of a wristop computer, the display of which wristop computer consists of a display element, comprising:

determining compass points;

displaying said compass points to a processor of the wristop computer, with the aid of graphical symbols; and showing a user of the wristop computer several predefined bearing values based on a predefined heading, for traveling over various closed patterns; and selecting any one of said predefined bearing values for keeping the user constantly aware of how a present bearing relates to the predefined heading.

10. A method according to claim 9, wherein the bearing values are shown at 60-degree intervals for a triangular pattern.

11. A method according to claim 9, wherein the bearing values are shown at 90-degree intervals for a square pattern.

12. A method according to claim 9, wherein the bearing values are shown with the aid of the display using the graphical symbols.

13. A method according to claim 9, wherein the bearing values are shown with the aid of vibration or sound or a light image.

14. A method according claim 9, wherein an alarm is implemented using the computer, for the turning points of the various patterns.

15. A method according to claim 14, wherein the alarm is set to give an alarm on the basis of time, the distance traveled, or the measured flow.

16. A method according to claim 14, wherein the alarm is set to give an alarm using light, vibration, or sound.

\* \* \* \* \*